Aug. 4, 1942.  S. M. BÄCKSTRÖM ET AL  2,291,602
REFRIGERATION
Filed Feb. 12, 1938
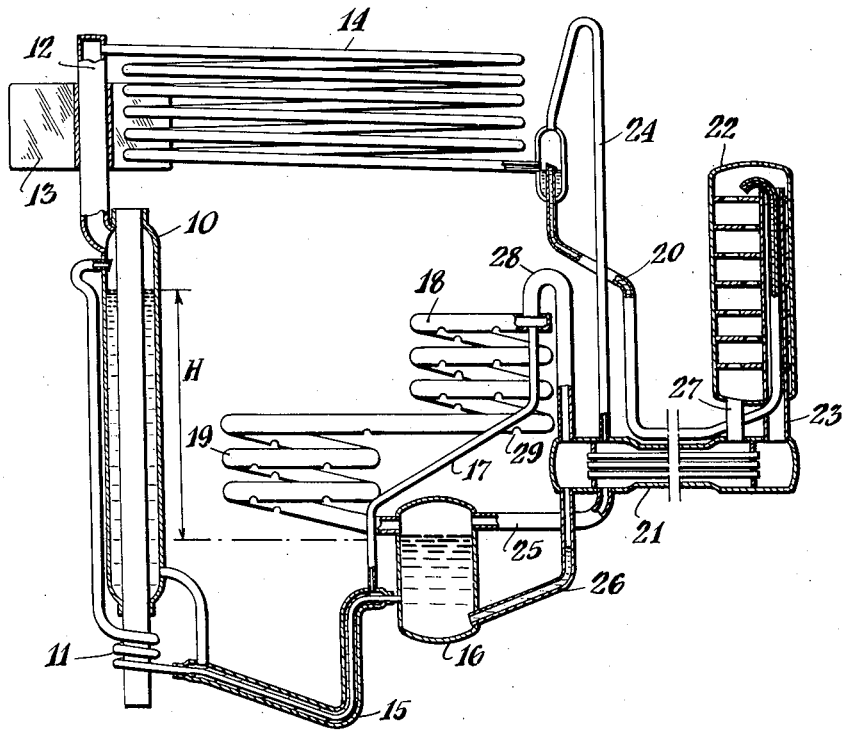
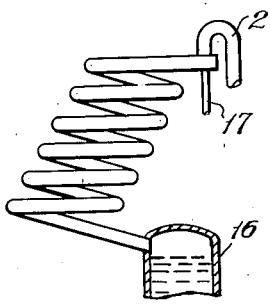
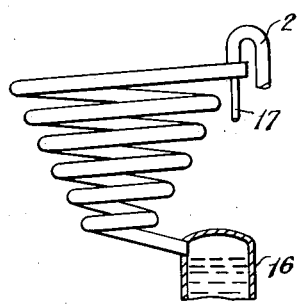
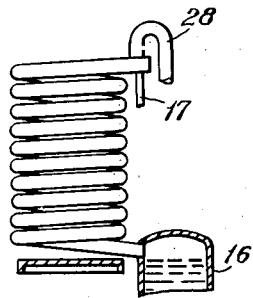
INVENTORS
Sigurd Mattias Bäckström and
Wilhelm Georg Kögel
BY
their ATTORNEY Patented Aug. 4, 1942

2,291,602

UNITED STATES PATENT OFFICE 2,291,602

REFRIGERATION

Sigurd Mattias Bäckström and Wilhelm Georg Kögel, Stockholm, Sweden

Application February 12, 1938, Serial No. 190,170
In Germany February 13, 1937

5 Claims. (Cl. 62—119.5)

This invention relates to air-cooled absorption refrigerating apparatus of the continuous cycle type working with auxiliary gas and having refrigerant vapour absorbed by an absorption solution caused to circulate between the boiler and a coiled tube absorber.

The object of this invention is to simplify the construction and assembly of units of this type and in particular of the absorber and condenser and further to dimension and arrange the absorber and if desired also the condenser so as to avoid the provision of additional auxiliary means for the removal of evolved heat such as cooling ribs or fins.

In absorption refrigerating apparatus it is well known to construct the absorber and condenser as a simple tubular coil fitted with cooling fins or the like. On account of the necessity of having such refrigerating apparatus, intended for domestic refrigerator cabinets, absolutely safe in operation, it has been customary for some time past to connect the various elements together in a gas-tight manner by welding and with such welded constructions the application of fins is difficult and extremely costly. In order to apply the cooling fins to the respective tubular elements of the absorber or of the condenser and to secure the same in position it has hitherto been necessary to subdivide the otherwise simple tubular coil of the absorber or condenser into a large number of parts. Then in practice the cooling fins have been applied to straight tube members and secured by expanding the tubes or otherwise and subsequently the sub-divided tube members have again to be interconnected in a gas-tight manner by welding.

Modern absorption refrigerating apparatus for domestic cooling purposes has therefore numerous welded joints which all have to be made by hand. The number of welded joints varies little with the size of the apparatus. Actually the welding operation is substantially more difficult with smaller apparatus since in practice the cooling fins of the coil absorber or condenser make the different welding points very inaccessible. For this reason in order to reduce the welding operations with smaller apparatus, for example up to a cold output of thirty calories per hour it has generally been necessary to utilise for some time past an absorber of cylindrical form which is always extremely dear to produce. Absorbers of this type have a smaller number of welded joints since the cooling fins can be applied without sub-division of the absorber and even after assembly of the absorber in the refrigerating apparatus. This subsequent application of the cooling fins is on the contrary impossible with coil absorbers.

In a certain type of heat operated refrigerating apparatus which works without any pumps for the liquid circulation it has been suggested to remove part of the heat evolved on the liquefaction of the refrigerant direct to the ambient cooling air through the peripheral surface of a tubular coil. This comprises a refrigerating apparatus wherein a mixture of refrigerant vapor and the vapour of a medium condensible more easily than the refrigerant is condensed in the presence of an auxiliary gas. With such an apparatus there is always equilibrium between the three media so that the partial pressure of the refrigerant has always the value which corresponds to the then existing temperature and is thus always the lowest possible, which possibility can scarcely be attained in practice with apparatus wherein absorption into a liquid takes place. However, the energy consumption of this known apparatus due to the difficulty of regaining the heat of vaporization of the third medium is so great that it can be operated only with the cheapest kinds of energy.

Absorption refrigerating apparatus wherein the absorption solution is supplied in the form of a stream trickling through the absorber is subject with regard to the equilibrium of the three media to other, substantially more difficult, conditions. Even in the case where the lifted absorption solution can be distributed over a relatively large surface by auxiliary means such as insert plates, pockets, wire gauze or the like it is practically impossible to maintain a uniform absorption in the available absorption medium, that is to maintain constant equilibrium between refrigerant vapour, solution and auxiliary gas. This non-uniformity must lead to an evaporator temperature higher than that in the abovementioned refrigerating apparatus since the partial pressure of the refrigerant has not the theoretically lowest value at the existing temperature.

In order to avoid the disadvantage of an increased evaporator temperature it has been hitherto customary to reduce the temperature of absorption by the application of auxiliary means such as cooling ribs or vaporizing and condensing systems so as to bring it as near as possible to the temperature of the cooling air.

In view of the above-mentioned difficulties concerning the application of the additional cooling surfaces and also in view of the low delivery head of possible pumps, the lowering of the absorber temperature is an extremely inconvenient and costly means for producing the desired low evaporator temperatures.

According to the present invention in an absorption refrigerating apparatus of the continuous cycle type containing inert gas and having absorption liquid circulated between a boiler and an absorber the method of removing the heat of absorption evolved in the absorber and if desired also the heat of liquefaction evolved in a liquifier consists in transferring the said heat directly to the ambient atmosphere through the peripheral surface of a tubular spiral or helical coil absorber or condenser respectively.

The absorber or condenser element according to this invention may be constructed in the form of a number of tubular spirals or helices relatively laterally displaced and dissipating evolved heat to the ambient atmosphere through the peripheral surface without auxiliary cooling means such as fins or the like.

Alternatively the number of tubular members may be replaced by a cylindrical helix having its axis inclined to the vertical. As a further alternative the absorber or condenser element may be constructed as one or more conical spirals without cooling fins. The invention will be hereinafter more fully described with reference to accompanying drawing in which:

Fig. 1 shows diagrammatically one form of apparatus constructed in accordance with the invention;

Fig. 2 shows a modified form of absorber in the form of a cylindrical or helical coil having an inclined axis.

Fig. 3 shows a further modified form of absorber in which the coil is in the form of a conical spiral; and Fig. 4 shows an absorber coil provided with a baffle plate.

The boiler of an absorption refrigerating apparatus is denoted by 10 and the usual gas bubble or vapour lift pump by 11. The vapours evolved in the boiler flow through a conduit 12 which is provided with a few cooling fins 13 for facilitating rectification of said vapours into the upper part of a condenser 14 constructed as a longitudinally extended tubular spiral without cooling fins, wherein the refrigerant vapour is condensed. The condensate flows through a conduit 20 arranged in heat conductive connection with a gas heat exchanger 21 of usual form to an evaporator 22 also of known type. The condenser is also connected with the gas heat exchanger by a ventilating conduit 24.

A storage vessel for the absorption solution is denoted by 16 and from this vessel rich solution flows through the inner conduit of a liquid heat exchanger 15 to the pump 11. The weak liquid is led from boiler 10 through the outer coil of the heat exchanger 15 and through tube 17 into the upper part of an absorber which consists of two helically-wound tubular coils 18 and 19. The weak solution flows downwardly through this absorber, liquid pools being formed therein to a sufficient extent by indentations 29. Any liquid refrigerant or absorption solution entering the gas heat exchanger from the evaporator is drained through the conduit 26 to the vessel 16.

The refrigerating apparatus operates with an auxiliary gas which becomes saturated with refrigerant in the evaporator 22 and passes through the gas heat exchanger 21 and the upper part of the vessel 16 into the left-hand coil 19 of the absorber where the refrigerant is washed away in known manner by the downwardly flowing absorption solution. This washing out of refrigerant continues in the right-hand member 18 of the absorber, and from here the gas now weak in refrigerant passes out through the conduit 28, the gas heat exchanger 21 and the conduit 23 back again to the evaporator 22. Both the liquid circulation and also the circulation of the auxiliary gas is effected therefore substantially as in the already known apparatus.

As will be seen from Fig. 1 the absorber is not fitted with cooling fins or other additional auxiliary means acting to carry away the heat of absorption. The total height of the absorber 18, 19 lies within the pumping head H which is determined by the circulating capacity of the pump 11. As already mentioned the absorber 18, 19 consists of two relatively laterally displaced tubular coils which are wound so as to provide at all points of the spirals as uniform an inclination as possible. In any case the angle of inclination must be sufficiently uniform and large as to avoid a danger of stopping the gas flow through liquid collecting in the coil even if the refrigerator cabinet cooled by the refrigerating apparatus stands at a slight inclination.

The coils are preferably wound so that the interval between the adjacent turns is about 3–5 mms. It has been determined in practice that as soon as the interval is reduced further from 3 to 2 mms. the cooling action of the cooling airstream is very strongly reduced, probably because with such an interval the cooling air at least when it is moved only by natural draught cannot pass between the individual tube members each absorber member 18 or 19 probably acting simply as a double-walled cylinder. The relative lateral displacement of the turns of the absorber coil in accordance with the invention may also be obtained by using a single cylindrical coil with its axis inclined, as is shown in Fig. 2. This facilitates the construction and assembly of the absorber and further improves the transfer of heat to the cooling air for the reason that as much of the absorber as possible is swept by fresh air.

The absorber according to the invention is preferably wound from a normal tube, if desired, profiled or indented for example in a winding machine. The curvature of the tube, due to centrifugal force, causes the liquid trickling downwardly to destroy automatically the film of strong liquid forming thereon, the absorption thus being improved and above all being made uniform. This construction has the further advantage that with the use of relatively narrow tube the inner surface thereof becomes wetted to a considerable extent. This is of importance since the heat transfer from liquid to the tube surface giving up the heat directly to the ambient air is very much greater than heat transferred from vapours to the tube wall.

Finally this construction of the absorber as a long tube of relatively narrow cross section increases the velocity of flow of the liquid passing through the absorber and consequently firstly produces an improvement in washing the auxiliary gas and secondly a further improvement of the heat transfer to the tube. It is thus possible according to the invention by the use of relatively narrow wound tube to provide in practice an absorber wall without cooling fins, which amounts to about one-third of the area which is necessary in apparatus of equal size according to the hitherto usual calculation for the size of the necessary heat transferring absorber walls.

If desired, the absorber may be wound in the form of conical spirals, as shown in Fig. 3, whereby each turn is displaced laterally with respect to adjacent turns and consequently each turn is swept by fresh cool air.

The invention is not limited to the illustrated embodiments but can be adapted in different ways to special requirements such as to increased cooling action of the ambient air, improved utilization of the apparatus space available and so on. It may for example be advisable to direct the air flowing through the spirals in a particular way by means of screens, guide plates or the like. If, for example, the lower opening of the coil is partly covered over by a circular steel plate arranged concentrically with the axis of the coil at about 3-5 mms. distance from the lower edge of the coils, as shown in Fig. 4, the temperature of the absorber is reduced by about 3°. The cooling air is sucked by flue action between the individual turns of the tube and this results in an improved cooling action. For improved utilization of the apparatus space, especially of the height of fall of the absorption liquid limited by the pump, the individual absorber spirals may be made as long as the height of fall and the coils connected in parallel. The absorption solution is thus divided up in known manner into a number of parallel streams, for example by means of a wire gauze or plate distributor.

The invention is of particular value in the case of built-in cabinets which are often provided with particularly small cooling air shafts; these can readily be utilised according to the invention by reducing the absorber into a plurality of coils connected in parallel. As built-in cabinets are generally adjusted so as to be exactly horizontal, undesired inclination of the absorber coils connected in parallel will not arise.

Having now particularly described and ascertained the nature of our said invention and in what manner the same is to be performed, we declare that what we claim is:

1. In an absorption refrigerating apparatus, a generator, a condenser, an evaporator, and an absorber connected together for flow of fluids therebetween, and a vapour lift pump for circulating an absorption liquid between said generator and said absorber, the evaporator and absorber being disposed at the proper relative levels to cause circulation therebetween of refrigerant and inert gas due solely to the difference in specific gravity of the inert gas and a mixture of the inert gas and refrigerant, said absorber including a pipe coil the entire outer surface of which is directly exposed to cooling air, said coil being in the form of a conical spiral, whereby each turn is displaced laterally with respect to adjacent turns.

2. In an absorption refrigerating apparatus, a generator, a condenser, an evaporator, and an absorber connected together for flow of fluids therebetween, and a vapor lift pump for circulating an absorption liquid between said generator and said absorber, the evaporator and absorber being disposed at the proper relative levels to cause circulation therebetween of refrigerant and inert gas due solely to the difference in specific gravity of the inert gas and a mixture of the inert gas and refrigerant, said absorber comprising a finless relatively narrow tube wound to form a coil, the turns of said coil being spaced from each other, said coil being so constructed and proportioned that it may provide a total exterior heat exchange surface area equal in effectiveness to, but having substantially one-third of the total heat exchange surface area normally required in, a finned absorber in an apparatus of equal capacity, said coil being so arranged as to present said total heat exchange area directly to a current of cooling air flowing upwardly under natural draft through said coil.

3. The combination set forth in claim 2 wherein each of said turns is spaced from adjacent turns by at least three millimeters.

4. The combination set forth in claim 2 wherein said coil is cylindrical in form, the longitudinal axis of said cylindrical coil being inclined to the vertical, each turn in said coil being displaced laterally with respect to adjacent turns.

5. The combination of the type set forth in claim 2, that includes a baffle member disposed beneath said coil, said baffle member being so constructed and arranged as to cause said air to flow between the turns of said coil and to enter the space within the coil.

SIGURD MATTIAS BÄCKSTRÖM.
WILHELM GEORG KÖGEL.